United States Patent [19]
Ridenour et al.

[11] 4,129,773
[45] * Dec. 12, 1978

[54] CONSUMABLE GUIDE TUBE ASSEMBLY

[75] Inventors: Charles E. Ridenour, Chicago Heights; Herman A. Fabert, Jr., Homewood, both of Ill.; John Tasker, West Milford; Hugo R. Larson, Ridgewood, both of N.J.

[73] Assignee: Abex Corporation, New York, N.Y.

[ * ] Notice: The portion of the term of this patent subsequent to Aug. 1, 1995, has been disclaimed.

[21] Appl. No.: 781,587

[22] Filed: Mar. 28, 1977

Related U.S. Application Data

[62] Division of Ser. No. 613,040, Sep. 12, 1975, Pat. No. 4,054,919.

[51] Int. Cl.² .............................................. B23K 35/22
[52] U.S. Cl. .................................. 219/146.23; 219/73.1
[58] Field of Search .................... 219/73 A, 146, 136, 219/73.1, 146.23; 138/140, 143

[56] References Cited

U.S. PATENT DOCUMENTS

| | | | |
|---|---|---|---|
| 2,289,938 | 7/1942 | Smith | 219/136 |
| 3,175,074 | 3/1965 | Culbertson | 219/146 |
| 3,352,993 | 11/1967 | Suzuki | 219/73 A |
| 3,405,228 | 10/1968 | Polizzano | 138/143 X |
| 3,558,845 | 1/1971 | Norcross | 219/73 A |
| 3,825,721 | 7/1974 | Carroll | 219/146 |
| 4,017,711 | 4/1977 | Honma | 219/146 |

Primary Examiner—E. A. Goldberg
Attorney, Agent, or Firm—Kinzer, Plyer, Dorn & McEachran

[57] ABSTRACT

A consumable assembly consituting the source of metal for welding by the electroslag process, comprising a stainless steel guide sleeve, a tube of copper inside the guide sleeve, and a weld wire inside the copper tube.

2 Claims, 6 Drawing Figures

CONSUMABLE GUIDE TUBE ASSEMBLY

This is a division of application Ser. No. 613,040, filed Sept. 12, 1975 now abandoned.

This invention relates to a method for joining sections of manganese steel.

Manganese steel is used extensively in castings subjected to severe abrasion or impact: earth moving equipment, grinding mills, railroad trackwork and so on, principally because the material embodies both ductility and wear resistance.

Large parts are economically manufactured by casting several sections and joining them by welding. Proportions are becoming enormous: in metallic mining dipper buckets of 25 cubic yard capacity are employed; 30 cubic yard capacities are being planned.

The labor cost for welding becomes severe as the castings become larger: more man hours are involved, less quality can be expected and delivery dates are retarded. This is so in spite of the fact that it is customary to join the parts by semiautomatic welding techniques.

The cost problem of joining heavy sections of manganese steel castings by welding (the heavier the section the more heat in-put) is exacerbated by the embrittlement phenomonon encountered when cast, heat treated manganese steel is reheated, as will now be explained.

Austenitic manganese steel, which is also called Hadfield's manganese steel after its inventor, is an extremely tough non-magnetic alloy in which the usual hardening transformation has been suppressed by a combination of high manganese content and rapid cooling from a high heat treatment temperature. It is characterized by high strength, high ductility and excellent wear resistance and is extensively used in severe gouging, crushing, impact and grinding wear applications because the material actually gets harder the more it is worked.

The nominal composition contains 1.2% carbon and 12% or 13% manganese as essential elements. Commercial products will vary within the 1.0-1.4% carbon and 10-14% manganese ranges established by ASTM Designation A128.

The as-cast structure of manganese steel contains carbides and other transformation products that produce marked brittleness by their continuity. The standard toughening heat treatment involves austenitizing above 1832° F. to place all the carbides in solution, followed by rapid cooling in water to prevent reprecipitation of the carbides.

Subsequent reheating of standard manganese steel parts is potentially more serious than for ordinary structural steels. Instead of the usual softening and increase in ductility, manganese steel will become embrittled if heated enough to induce partial transformation of the metastable austenite. As stated in the *Metals Handbook* (1961): "As a general rule manganese steel should never be heated above 500° F., either by accident or plan, unless the standard toughening treatment is to be applied." Both time and temperature are involved, lower temperatures requiring longer for impairment to develop. Only a few minutes are required at the dull red heat of 1000° to 1200° F. to begin embrittlement of this steel.

Since prolonged reheating of toughened manganese steel results in embrittlement, only arc welding is currently recommended for welding manganese steel. With a covered electrode or semiautomatic welding, the welder can usually control heat in-put in such a way that no area is seriously overheated.

The problem, then, is essentially two fold. Larger sections with long weld seams entail high labor cost; thick sections (say two to three inches or more) involve a great deal of heat in-put likely to produce embrittlement.

Electroslag welding is known to be more economical than semiautomatic or manual arc welding from the standpoint of time required. However, the thermal cycles involved are discouraging to the idea of applying the process to joining sections of manganese steel.

The foregoing explains the problems we faced in recognizing the need to find a more acceptable way to join sections of manganese steel, particularly thick sections. The objects of the invention are: to use electroslag principles to supplant semiautomatic arc welding (and the other forms as well) as a method of joining cast manganese steel sections; to produce a weld of high integrity and satisfactory properties in manganese steel parts using electroslag principles; and to attain such a weld by constantly maintaining a reserve of austenite stabilizers during progression of the weld. Other objects of the invention are to incorporate austenite stabilizers in the weld wire and/or consummable guide; to reduce hot tearing in the weld metal and heat affected zone of the base metal; to enable the highest possible welding current to be used, thereby accelerating the process so that the base metal is exposed to high temperature for as little time as possible; and to reduce the likelihood of an unacceptable embrittlement of the base metal.

Figure 5:
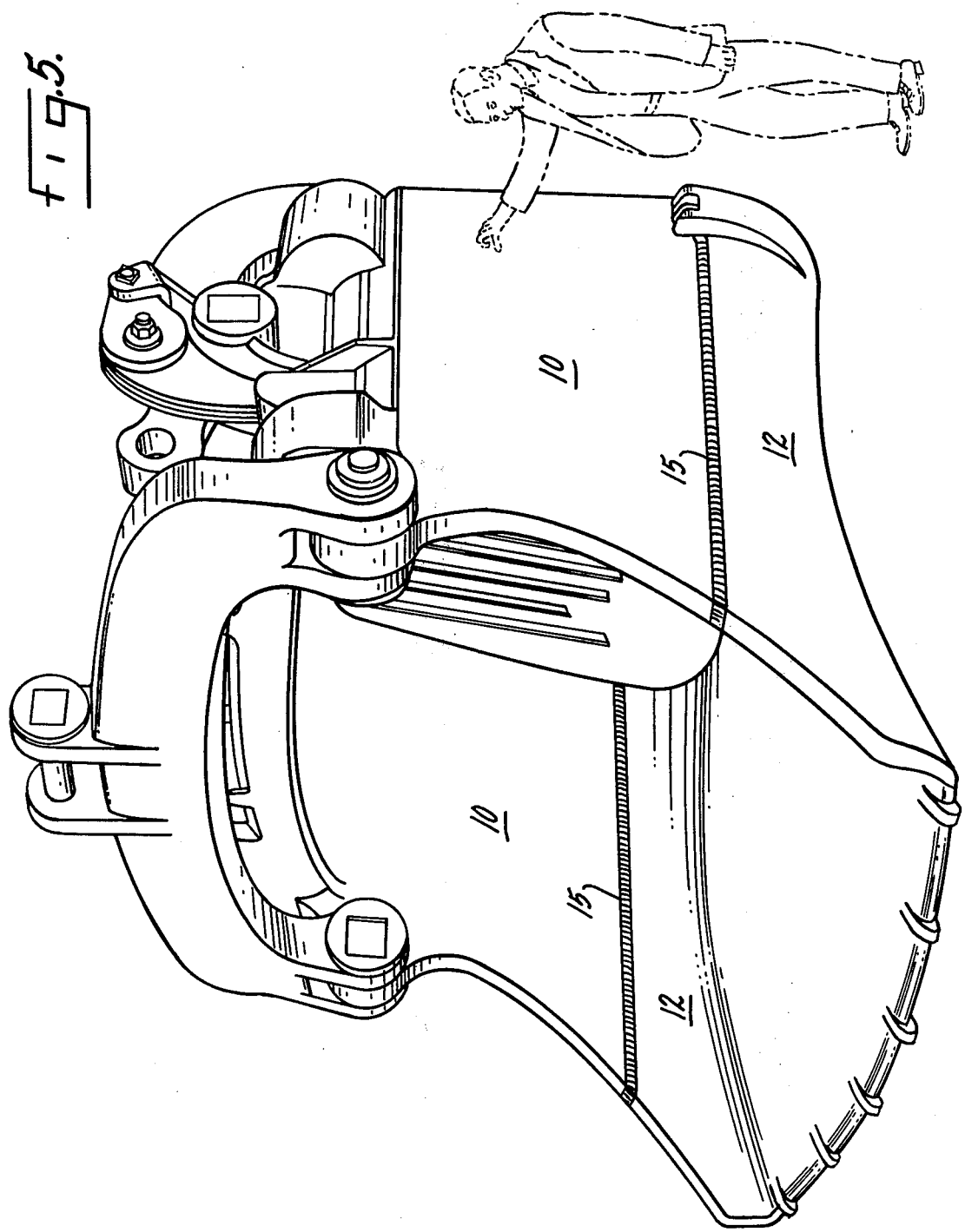
FIG. 5 is a perspective view of a dipper bucket which can be fabricated in accordance with the present invention.

Reference may be made to FIG. 5 for a consideration of practices involved when joining sections of manganese steel by a weld. FIG. 5 is a perspective of a manganese steel dipper bucket. The middle and lower sections 10 and 12 are separate castings of manganese steel joined by a long butt weld 15. In use, any part of the bucket may be in tension. One advantage of manganese steel is its inherent ductility; it will stretch when tensioned and at the same time the tensioned area work hardens in the localized area. As a consequence the original yield strength of the pristine metal is increased. The adjacent pristine metal, not stretched, is relatively weaker. On the next occurence of tension, the adjacent areas of pristine metal yield, work harden and increase in yield strength (the same pattern as before) which is to say the increase in strength is progressive throughout a section, progressively as that section is tensioned from time to time. There is, then, a reserve of ductility in austenitic manganese steel. In field service this reserve is important in order that there will be no failure due to unexpected, abnormal tensioning. For this reason, high temperature embrittlement which depreciates the reserve in ductility cannot be tolerated.

However, by our reasoning, the reserves are large enough to tolerate some embrittlement in the heat affected zone, if controlled to an acceptable degree. But an additional factor is involved, namely, to obtain a substantially uniform profile of mechanical properties across the weld zone, taking into account the indisputable fact that the base metal has to melt as the weld metal is being deposited. We found the problem of attaining substantially matched yield strength could be resolved in principle during electroslag welding by employing a weld wire of a particular alloy content, assuming of course proper control over weld parameters.

Electroslag welding is a welding technique based on the generation of heat by passing an electrical current through molten slag. Copper shoes, normally water cooled, are used to bridge the gap (joint) of the components to be welded, thus forming a cavity to hold the molten flux. Filler metal obtained from a welding wire is fed into the molten flux and the resistance of the slag bath to the current flow provides the heat to melt the wire and the adjacent sections of the base metal. A guide tube is ordinarily used to feed the electrode wire into the molten flux and this guide tube also melts and contributes metal to the weld.

The major obstacle to successful electroslag welding of austenitic manganese steel is the vastly different time/temperature relationship of an electroslag weld as compared to a shielded metal-arc weld.

With a metal arc, the temperature of the fusion zone is relatively high instantaneously but it cools rapidly and only a very small amount of metal is at a high temperature relative to the weld. In electroslag welding, however, the temperature of the flux pool (3,000°-4,000° F.) is much lower than the temperature of a welding arc but the mass of the slag pool and molten weld metal at a high temperature is relatively large. Since a larger area of the base metal is heated in electroslag welding, both the heating and cooling rates of the metal in the heat affected zone (HAZ) are much slower in comparison to arc welding. This thermal feature of electroslag welding can be very beneficial when welding carbon and alloy steels. In these steels, the slow cooling rate considerably reduces the risk of cracks developing in the heat affected zone of the weldment. However, this characteristic thermal cycle associated with electroslag welding adversely affects the properties of austenitic manganese steel for reasons explained above.

In the first attempt to join manganese steel sections by the electroslag process, three weldments were made, one 2 inch section and two 4 inch sections, using an experimental welding wire. Otherwise, welding parameters were mainly based on experience with other steels. The base metal for two of the weldments consisted of standard manganese steel and for the third weld a grade of manganese steel containing molybdenum was used (ASTM-A-128, Grade E-1). This particular grade is known to offer better resistance to heat embrittlement than the regular grade of manganese steel.

Figure 1:
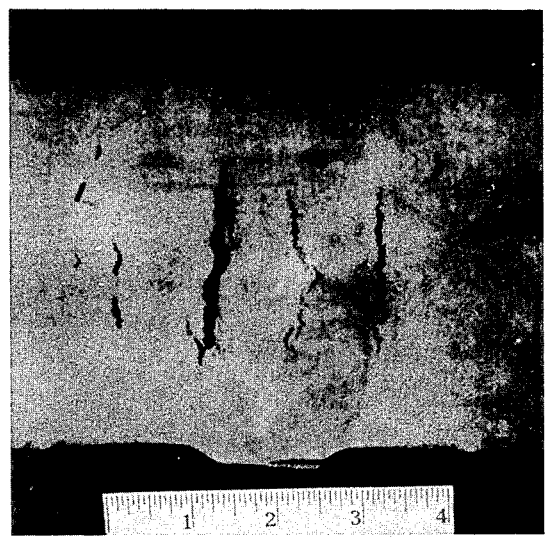
FIG. 1 is a dye checked section of an electroslag weld, showing severe cracking in the weld metal and heat affected zone of the manganese steel base metal.

Nonetheless, all three welding tests were unsuccessful due to severe cracking in both the weld deposit and the heat affected zone of the base metal - see FIG. 1.

Microstructural examination revealed severe embrittlement of the weld and base metal and evidence of incipient melting in the base metal. In addition, large metallic inclusions were found in the weld, suspected as being unfused portions of the carbon steel guide tube normally recommended for electroslag welding.

The abnormal structure resulted in spite of the fact that the welding wire contained a relatively large amount of nickel, normally considered helpful in avoiding embrittlement of manganese steel. The nominal analysis for the wire was 0.92C, 20.8Mn, and 3.2Ni.

As will be evident from FIG. 1, extensive cracks are revealed at the interface between the weld metal and the weld. Cracks were persistent throughout the cross-section and were not confined to the exposed end surfaces. Heat damage, as evidenced by a continuous grain boundary carbide network, was observed in the base metal up to an inch from interface.

Analysis showed that melting of the base metal contributed nearly fifty percent of the weld metal, a considerable dilution. Realization of this large dilution factor, coupled with the immense heat input, could be viewed as causing catastrophic instability of austenite in the critical area. It was therefore reasoned that modifications in both the weld wire and guide tube conceivably could be relied on to preserve austenitic stability, provided heat input could be reduced.

The heat input was reduced by:
a. Reducing the root gap from 1¼ inches to ⅜ inch;
b. Limiting the electrical parameters to 400 amps and 38 volts; and
c. Using a smaller diameter wire (1/16 instead of 3/32 inch) since a thinner wire would provide increased deposition rate for a given amperage.

The base metal was further modified to provide improved heat resisting properties, the nominal chemical analysis being:

| C % | Mn % | Mo % | Si % | P % |
|---|---|---|---|---|
| 0.80 | 14.00 | 1.20 | 0.5 | .05 max. |

This chemical analysis still falls within ASTM specification A-128, Grade E-1.

To compensate for the tremendous dilution by the melting base metal, to introduce austenite stabilizers and in a further effort to reduce heat input, a stainless steel guide tube (SAE 304: 18Cr, 9Ni) was combined with a welding wire having the following nominal analysis: 0.9C, 18Mn, 7Cr, 6Ni. The guide tube, it was reasoned, would melt at a temperature lower than the carbon steel guide initially used; the nickel-chromium content in both the guide tube and weld wire would impart heat resistance (resistance to embrittlement of the weld metal) and would continuously contribute austenite stabilizers in the form of nickel, manganese and carbon during the progression of the weld.

These modifications in the guide tube and weld wire were determined as responsible for establishing mechanical properties across the weld satisfactorily matching those of a standard manganese steel (Y.S. 50–55000; El. 30–34) as will be evident from data obtained from this successful experimental weld set forth in Table 1:

TABLE 1

Automatic Welding of Manganese Steel
2" Section Test Weld

Base Metal

TABLE 1-continued

Automatic Welding of Manganese Steel

2" Section Test Weld

| Heat | C % | Mn % | Si % | Mo % | P % |
|---|---|---|---|---|---|
| 2-001 | 0.82 | 14.02 | 0.44 | 1.25 | 0.028 |
| 2-020 | 0.81 | 14.10 | 0.51 | 1.22 | 0.020 |

Wire Composition

Experimental formulation AN 4 calculated composition:

| C % | Mn % | Cr % | Ni % |
|---|---|---|---|
| 0.932 | 18.77 | 7.67 | 6.39 |

(Calculated to provide a weld composition of 0.80% C, 14.04% Mn, 4.01% Cr, 3.52% Ni)

Actual Weld Analysis:

| | C % | Mn % | Si % | Cr % | Mo % | Ni % | P % |
|---|---|---|---|---|---|---|---|
| Burn 1 | 0.81 | 15.70 | 0.36 | 4.12 | 0.52 | 3.40 | 0.022 |
| Burn 2 | 0.82 | 15.80 | 0.40 | 4.13 | 0.50 | 3.46 | 0.021 |
| Burn 3 | 0.79 | 15.70 | 0.36 | 3.92 | 0.55 | 3.45 | 0.022 |

Cross-Weld Tensile Properties

| Sample No. | Y.S. | T.S. | El. % | R.A. % |
|---|---|---|---|---|
| AT-484-A | 54,999 | 102,000 | 33.5 | 44.9 |
| AT-484-E | 50,000 | 104,000 | 34.0 | 35.0 |

When giving the analysis (chemistry) of the base metal, wire and weld it is understood the remainder or balance (percent by weight) is substantially iron, that is, iron diminished by incidental impurities.

Based on the successful trial weld, pilot production was instituted. However, upon sectioning the initial pilot welds internal cracks were found in the heat affected zone of the base metal (HAZ zone); a typical example is shown in FIG. 2.

Figure 2:
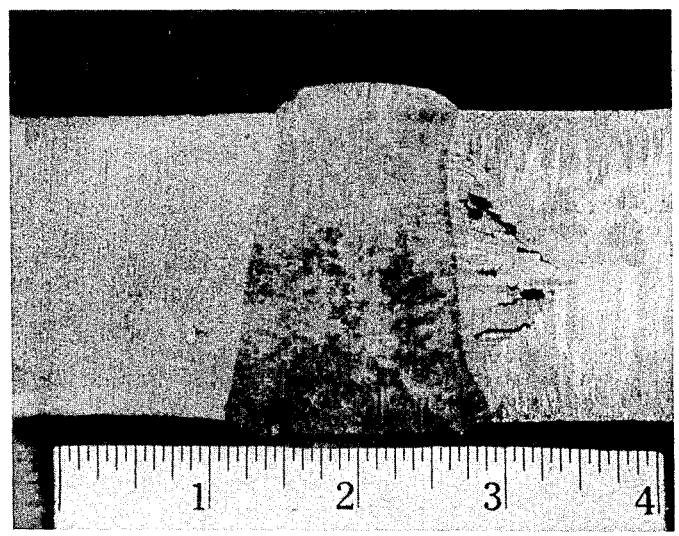
FIG. 2 is a macro-etched section of an electroslag weld showing internal cracks in the base metal.
Figure 3:
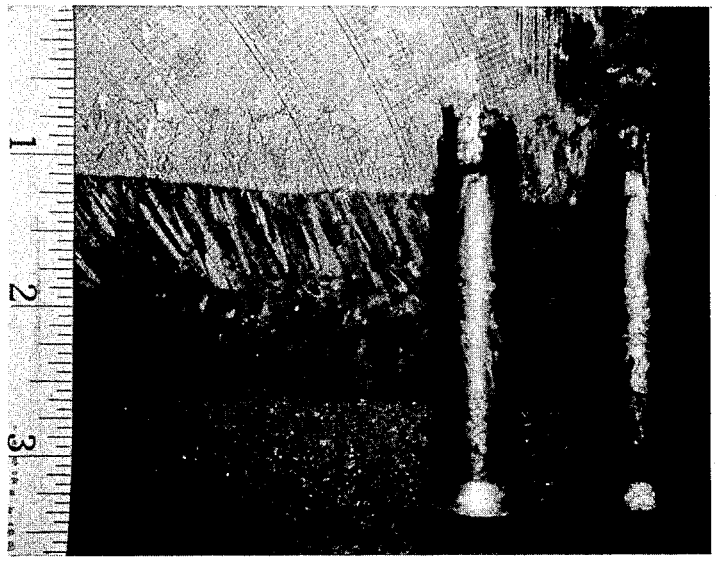
FIG. 3 is a macro-etched section through an electroslag weld showing cracking in the heat affected zone of the base metal with superimposed cross weld tensile test bars.

Cross weld tensile tests (0.505 inch dia. bars) on the weld shown in FIG. 2 exhibited zero ductility, FIG. 3 and Table 2, but microstructural examination did not reveal any obvious structural embrittlement in the base metal HAZ which would account for cracking. These microstructural observations were confirmed by taking smaller tensile samples (0.242 inch dia. bars) from crack-free regions of the heat affected zone and the weld metal. The tensile tests exhibited very good ductility values (see Table 2) which clearly ruled out the possibility of a heat embrittled microstructure as the cause of the cracking, verifying that we were stabilizing the austenite in the weld by means of nickel in both the weld wire and guide tube, and by molybdenum in the base metal.

TABLE 2

Cross Weld Tensile Tests (.505" Dia. Bars)

| Lab. No. | Y.S. (PSI) | T.S. (PSI) | El.% | R.A.% |
|---|---|---|---|---|
| AU-665-1 | 37,200 | 37,900 | 0 | 2.3 |
| AU-605-2 | 36,600 | 38,200 | 0 | 2.3 |

Results of Tensile Tests With Small Dia. Test Bars (.252" Dia.)

| Lab. No. | Location | Y.S. (PSI) | T.S. (PSI) | El.% | R.A.% |
|---|---|---|---|---|---|
| AU-665-A2 | Weld* | 59,160 | 112,500 | 38.0 | 37.0 |
| AU-665-B1 | H.A.Z.** | 57,000 | 107,800 | 36.0 | 36.4 |

*Tensile bar taken from all-weld metal.
**Tensile bar taken through fusion zone on the fine grained side of the weld.

Figure 4:
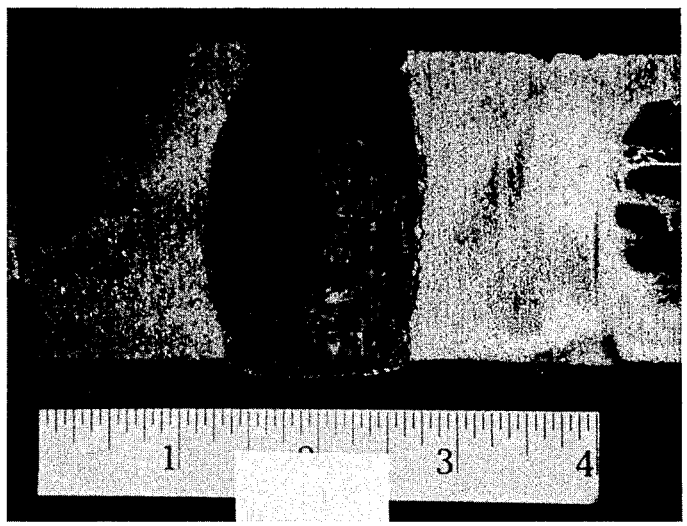
FIG. 4 is a macro-etched section through an electroslag weld showing hot tears at the interface between the weldment and base metal.

Since the cracks were always located in the coarser grains, further test blocks of base metal were produced with a controlled fine grain structure to determine whether grain size and cracking were related. Additional weldments were produced with these fine grain blocks. Upon sectioning, internal cracks were again revealed, except now the cracks were present on both sides of the fusion zone; an example is shown in FIG. 4.

It will be noted from Table 1 that the amount of phosphorus in the base metal involving the successful experimental weld was 0.028 and 0.020. On the other hand it was found that pilot welds, FIG. 3, were performed on a base having 0.038 phosphorus.

Based on the above, it was suspected that the poor high temperature strength of manganese steel was the problem and high temperature tearing was occuring.

When an electroslag weld solidifies, there is considerable contraction and both the weld deposit and superheated base metal must possess sufficient strength to withstand the high strain generated by the hindered contraction, otherwise hot tears will result. Contraction is hindered by the mass of the parts being joined.

In the case of manganese steel, higher than normal strains can be generated during solidification of the electroslag weld due to the high coefficient of thermal expansion of manganese steel (deemed to be 1½ times that of ferritic steels). In addition, much steeper temperature gradients will exist causing a higher strain concentration because of the low thermal conductivity of manganese steel (about one-sixth that of pure iron).

This situation is further aggravated due to the relatively poor high temperature strengths of manganese steel especially as the phosphorus content increases. In manganese steel castings with phosphorus contents above 0.06%, phosphide eutectic envelopes can be observed at the grain boundaries which drastically reduce the high temperature ductility of the steel. It has been postulated that at elevated temperatures the eutectic is either soft or completely molten and if a stress is applied while in this temperature range the grains can easily separate wherever the envelope exists. Even below 0.06% phosphorus, where the phosphide eutectic is not visible with an optical microscope, the properties of manganese steel are adversely affected by phosphorus.

Since the degree of hindered contraction and the temperature gradients are more severe with an electroslag weld, increased susceptibility to hot tearing (and a lower tolerance for phosphorus) can be expected in the heat affected zone.

Therefore, after specifying an upper limit for phosphorus of 0.025 to 0.035 in the base metal, three additional welds were produced on a pilot scale, using the stainless steel guide tube and the weld wire identified in Table 1. All three welds were tear-free and excellent ductility values were obtained as shown by Table 3:

TABLE 3

AUTOMATIC WELDING OF MANGANESE STEEL

Test Welds No's 49, 50 and 51

I. Base Metal:

| Heat No. | C% | Mn% | Si% | Cr% | Mo% | P% | Al% |
|---|---|---|---|---|---|---|---|
| 74-018 | 0.79 | 13.20 | 0.52 | 0.64 | 1.02 | .029 | .090 |

II. Welding Parameters:

| | |
|---|---|
| Thickness of Test Plate | 2" |
| Number of Electrodes | 1 |
| Ocillation Distance | 1.5" |
| Root Gap | 3/4" |
| Electrode Wire | 1/16" Dia. |
| Electrode Guide Type | 304 SS |
| Current | 400 Amps |
| Voltage | 37.5 Volts |

III. Cross-Weld Tensile Properties (.505" Dia.)

| Sample No. | Yield Strength (PSI) | Tensile Strength (PSI) | El.% | R.A.% |
|---|---|---|---|---|
| 49-A | 56,640 | 101,300 | 25.0 | 32.9 |
| -B | 56,400 | 105,700 | 26.0 | 26.5 |
| 50-A | 54,600 | 113,200 | 35.0 | 37.0 |
| -B | 58,200 | 110,800 | 31.0 | 28.9 |
| 51-A | 56,750 | 117,740 | 37.5 | 38.2 |
| -B | 56,880 | 117,200 | 37.0 | 35.0 |
| -C | 56,400 | 114,500 | 37.0 | 37.7 |

Two additional welds were produced at a higher amperage (450 instead of 400 amps) but both exhibited tears in the HAZ of the base metal. Thus, it was concluded that 2 inch section manganese steel plates could be successfully joined with the electroslag process by operating at 400 amps using a base metal containing a restricted amount of phosphorus.

A small test sample of 5/64 inch diameter weld wire was produced with a lower carbon content to provide 0.60% C instead of 0.80% in the weld. This change was made in order to lower the yield strength of the weld deposit to more closely match the yield strength of the base metal; also a lower yield strength would help to reduce the tearing susceptibility by allowing easier deformation of the weld during cooling and thus promoting a better distribution of induced strain across the total weld joint.

For the initial weld trial with the lower strength wire, low phosphorus (and low aluminum for reasons explained below) were used and the electrical parameters were maintained at 400 amps and 38 volts. A very good weld was produced with excellent cross-weld tensile properties.

In order to determine whether higher amperages could be tolerated with the combination of lower strength wire, low phosphorus and low aluminum, a weld was produced at 500 amps. This weld again provided excellent results and it was therefore concluded the lower strength wire was also acceptable. Later tests with a 3/32 inch diameter wire gave equally good results, 3/32 inch diameter wire being easier to produce than a 5/64 inch wire.

Figure 6:
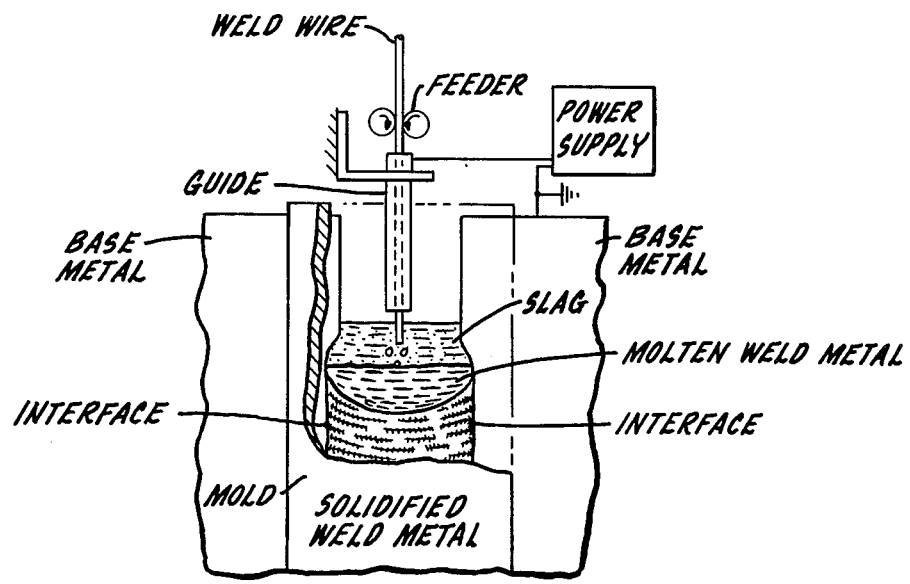
FIG. 6 is a schematic view of an electroslag welding system as it may be used to practice the present invention.

The process in practice is shown schematically in FIG. 6. The two sections of base metal are separated and the sides are closed by a pair of molds such as graphite or water cooled copper shoes. The guide and weld wire are disposed in the gap between the base metal sections. The weld wire and/or guide tube is used as an electrode, while grounding the base metal sections to establish an electrical couple. In the course of perfecting the weld the weld wire is fed at an appropriate rate. A continuous slag cover is maintained by adding flux from time to time.

RATE OF WELD METAL DEPOSIT; COMPOSITE GUIDE TUBE

Having determined the effect of phosphorus and aluminum, the preference for molybdenum in the base metal and the chemistry for the weld were, welds were tried on a production scale. Two conclusions emerged: (1) embrittlement and tearing are a function of the rate at which weld metal is deposited; and (2) a composite guide, characterized by a copper guide tube inside a stainless steel sleeve, is required for long welds.

Considering first the requirement of a composite guide it was found that in the instance of long seams of the character shown at 15 in FIG. 5 the stainless steel guide tube distorted. A bent guide tube results in erratic arc behavior and uncontrolled weld metal deposit. It was reasoned that distortion was caused by prolonged exposure of the guide tube to high temperature. The problem was further complicated by the fact that stainless steel was desirable as a guide not only because of its compatability with the chemistry of the weld wire, developed after considerable thought and experiments, but also because of its role in maintaining the austentic character of the weld deposit.

Nonetheless the initial use of a carbon steel guide was reevaluated. It was ruled out because a minimum diameter of ¼ inch was required for an eight foot weld seam and a diameter of that size would virtually monopolize a ⅜ inch gap between sections to be welded, causing arcing.

If the stainless steel guide could be insulated from the effect of the electrical current this would diminish the distortion problem. This was achieved by a decision to use a stainless steel tube as an external supporting sleeve for a copper guide tube, the weld wire in turn being centered in the cooper guide tube. Copper is much weaker structurally than steel but its electrical conductivity and thermal conductivity are vastly superior. Also, copper does not adversely effect the achievement of austenite; indeed copper encourages austenitic stability.

The composite guide thus developed (e.g. a ¼ inch diameter copper guide tube inside a ⅜ inch stainless steel support sleeve) performed admirably. The copper tube employed as the electrode easily carried the current and its structural weakness was obviated by the steel sheath. 0.035% phosphorus is verified and aluminum should be limited to 0.05 to 0.06%, nominal. The electrical parameters may be varied and the gap adjusted for optimum conditions as long as the rate of deposit is in the range of 0.6 to 0.9 inches per minute. A slower speed increases the chance for embrittlement; a higher speed encourages hot tears because of the thermal gradient being too steep, even though embrittlement may not occur. The smaller the gap the faster the rate of deposit, and vice versa, other conditions being equal. Therefore, with a given electrical rate, the gap is adjusted and a feed rate for the wire is selected, which will result in a weld metal deposit within the limit of about 0.6 to 0.9 inches per minute.

Also, the weld wire analysis may be in the following range:

C:—0.55 to 1.15
Mn:—16.5 to 20.5
Cr:—6—to 10
Ni:—5—to 8
Fe: balance, substantially.

We claim:

1. An electroslag welding device constituting a source of metal for welding by the electroslag process and consisting of a stainless steel guide sleeve both to resist embrittlement of the weld metal and to lend structural support to an electrode, a tube of copper inside, and supported by, the guide sleeve and serving as an electrode for conducting the current away from the guide sleeve, and a weld wire inside the copper tube.

2. A device according to claim 1 for welding two opposed sections of manganese steel and in which the weld wire analysis is in the following range:

C:—0.55 to 1.15
Mn:—16.5—to 20.5
Cr:—6—to 10
Ni:—5—to 8
Fe:—balance, substantially.

* * * * *

UNITED STATES PATENT AND TRADEMARK OFFICE
CERTIFICATE OF CORRECTION

PATENT NO. : 4129773
DATED : December 12, 1978
INVENTOR(S) : Charles E. Ridenour, et al It is certified that error appears in the above-identified patent and that said Letters Patent are hereby corrected as shown below:

Col. 6, TABLE 3, "Ocillation" should read --Oscillation--.

Col. 7, line 49, "were" should read --wire--.

Col. 8, line 2, "austentic" should read --austenitic--.

Col. 8, line 15, "cooper" should read --copper--.

Col. 8, delete line 26; line 27, delete "limited to 0.05 to 0.06%, nominal."

Signed and Sealed this

First Day of May 1979

[SEAL]

Attest:

RUTH C. MASON
Attesting Officer

DONALD W. BANNER
Commissioner of Patents and Trademarks